United States Patent [19]

Halfmann

[11] Patent Number: 4,942,927
[45] Date of Patent: Jul. 24, 1990

[54] ADJUSTABLE SUGAR BEET HARVESTER LIFTER WHEEL FILLER SPOKES

[76] Inventor: Craig P. Halfmann, Rte. 2 - P.O. Box 215, Stephen, Minn. 56757-0215

[21] Appl. No.: 372,048

[22] Filed: Jun. 27, 1989

[51] Int. Cl.$^5$ ............................................. A01D 25/04
[52] U.S. Cl. ........................................ 171/58; 171/93; 172/557
[58] Field of Search ..................... 171/50, 55, 58, 84, 171/95, 97, 98; 172/518, 535, 549, 557, 604

[56] References Cited

U.S. PATENT DOCUMENTS 2,944,611  7/1960  Rollins ................................. 171/58

FOREIGN PATENT DOCUMENTS 898983  1/1982  U.S.S.R. ................................ 171/58

OTHER PUBLICATIONS

John Deere Pubication, "Beet Equipment", p. 12, May 1986.
Heath Publication, "Hydraulic Six-Row Direct Beet Harvester", May 1986.
"Minnesota/Dakota Grower Ideas", from Sugarbeet Grower/Mar. 1989, p. 18.
"Sugarbeet Idea Contest Winner is a Time Saver", from Farm & Ranch Guide, p. A-2, Friday, Mar. 10, 1989.

*Primary Examiner*—Randolph A. Reese
*Assistant Examiner*—Jeffrey L. Thompson
*Attorney, Agent, or Firm*—Vidas & Arrett

[57] ABSTRACT

A lifter wheel filler spoke assembly designed for permanent installation on a lifter wheel. The filler spoke assembly is comprised of a ring plate with filler spokes equally spaced about the circumference of the ring plate, with the ring plate being provided with a plurality of slots used for attaching the assembly to the lifter wheel. The slots allow the filler spoke assembly to be rotated between a closed and open position.

13 Claims, 3 Drawing Sheets

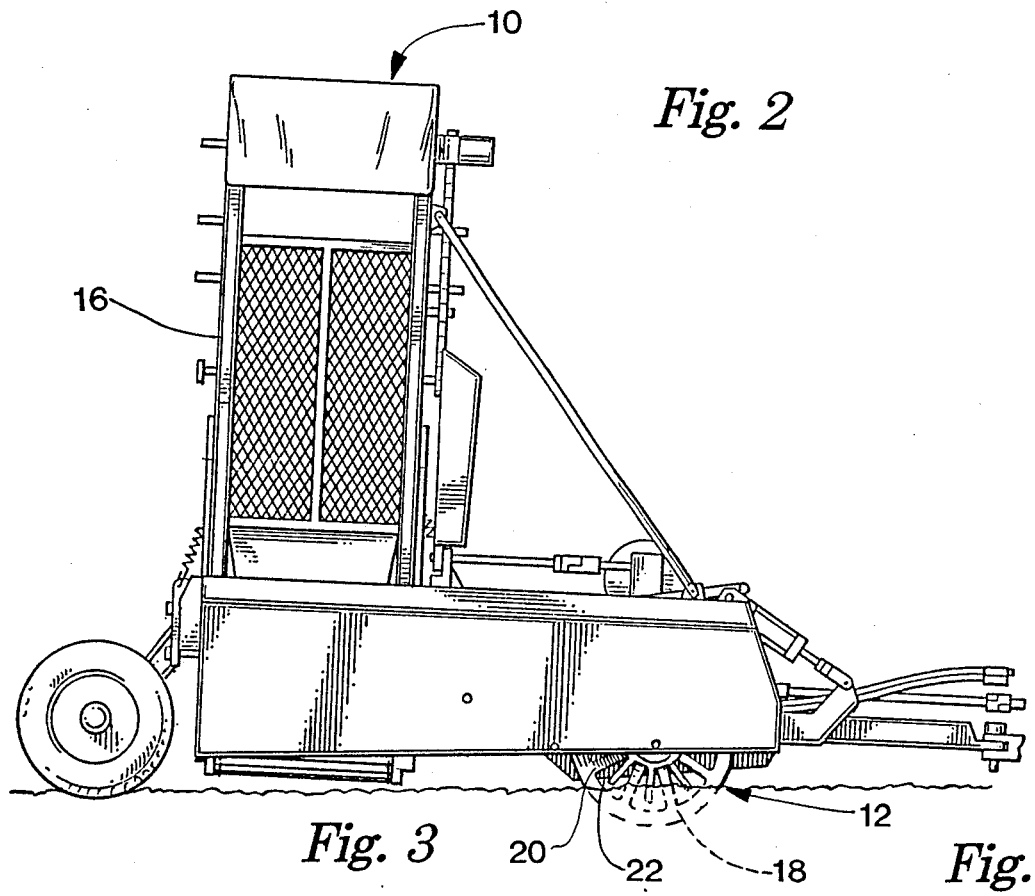
Fig. 2
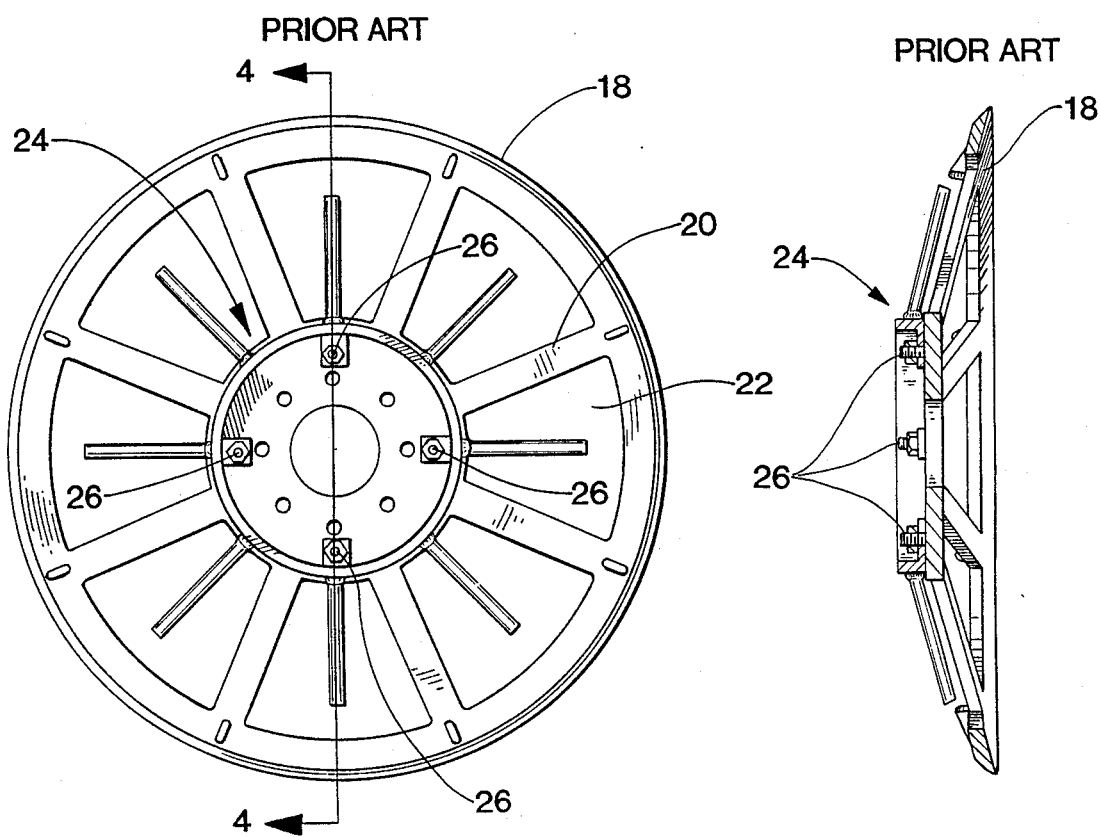
Fig. 3 PRIOR ART
Fig. 4 PRIOR ART

ADJUSTABLE SUGAR BEET HARVESTER LIFTER WHEEL FILLER SPOKES

BACKGROUND OF THE INVENTION

1. Field of the Invention

The invention relates generally to lifter wheel filler spokes, and specifically to filler spokes for use in harvesting sugarbeets.

2. Description of the Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

Filler spokes are used to prevent sugar beets from falling through the open spokes in lifter wheels when the ground is in a dry condition. Previous filler spoke devices for use with lifter wheels were installed and removed each year. This required locating the filler spokes and the bolts, clamps, cables and other parts necessary for installing them on the lifter wheels. The filler spokes are not necessary when the ground is in a wet condition, potentially requiring installation and removal of the filler spokes several times during the harvest. The temporary installation of a filler spoke assembly on a lifter wheel has been done with lifter wheels of the following models: Heath; Hesston; W.I.C.; John Deere; Parma, and Lockwood.

SUMMARY OF THE INVENTION

Applicant set out to solve the problem of having to temporarily install and remove filler spokes each year, sometimes several times per harvest depending on the condition of the ground. Applicant solved this problem by providing a filler spoke which is designed to be installed on the lifter wheel permanently. This proves to be a great time saver during harvest season. In fact, applicant's idea was such an improvement over the previous filler spoke assemblies that he won first place in the 1988 Grower Idea Contest, which is sponsored by the Minnesota/North Dakota Sugarbeet Research and Education Board.

Filler spoke assemblies according to the present invention are provided with slotted holes which receive bolts used for attaching the filler spoke assembly to the lifter wheels. The slotted holes allow the filler spokes to be rotated to an open or closed position with respect to the lifter wheel spokes by loosening the locking nuts on the bolts, rotating the filler spoke assembly, and re-tightening the nuts. During dry conditions the filler spokes can be rotated to the closed position, which is defined as the filler spokes filling in the spaces between the lifter wheel spokes. During wet conditions the filler spokes can be rotated to the open position, which is defined as the filler spokes lining up with the lifter wheel spokes. Various models of the filler spokes are provided for attachment to various models of lifter wheels.

BRIEF DESCRIPTION OF THE DRAWINGS

A detailed description of the invention is hereafter described with specific reference being made to the drawings in which:

FIG. 2 is a side elevational view of a beet harvester with the inventive filler spokes installed;

FIG. 3 is a side elevational view of a prior art filler spoke;

FIG. 4 is a section taken along line 4—4 of FIG. 3;

DESCRIPTION OF THE PREFERRED EMBODIMENTS

Figure 1:
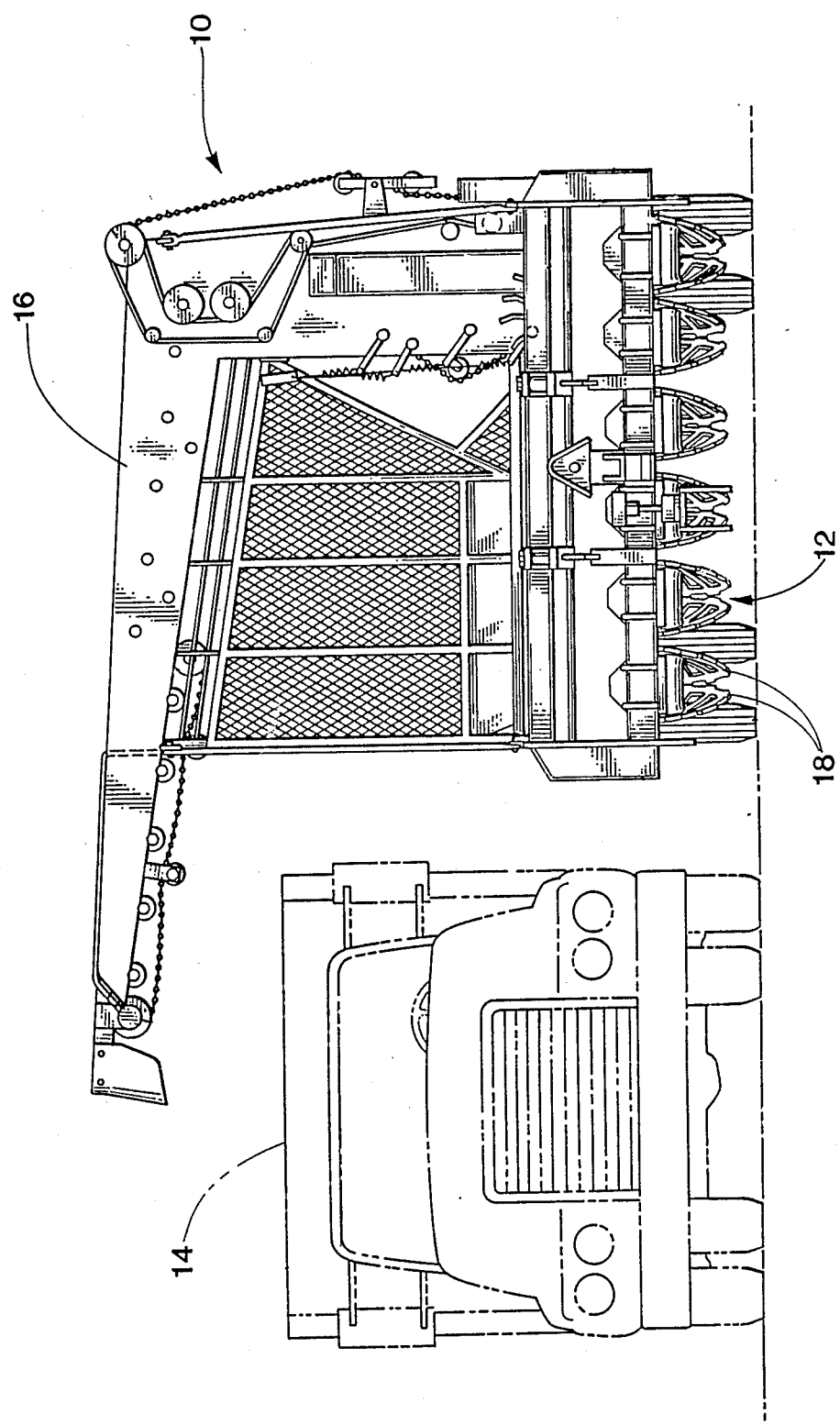
FIG. 1 is a front elevational view of a beet harvester.

While this invention may be embodied in many different forms, there are shown in the drawings and described in detail herein a specific preferred embodiment of the invention. The present disclosure is an exemplification of the principles of the invention and is not intended to limit the invention to the particular embodiment illustrated.

Referring now to FIG. 1 a sugar beet harvester is shown generally at 10, where the lifter wheel assemblies, shown generally at 12, extract sugar beets from the ground and convey them to truck 14 via conveyer 16. The lifter wheel assemblies are each made up of two lifter wheels 18 as is well known in the art.

Referring now to FIG. 2 the harvester 10 is shown with the lifter wheel assembly 12 in the harvesting position. In this position, the lifter wheel assembly 12 extends a distance into the ground, where the two lifter wheels 18 pinch together to harvest the sugar beet and convey it to the truck 14, as is well known in the art. Lifter wheel 18 has a plurality of spokes 20 which form openings 22 through which the ground passes as the wheel assembly 12 turns. During dry conditions the lifter wheel filler spokes must be installed to prevent the beets from also passing through the openings 22.

Referring now to FIGS. 3 and 4 a prior art lifter wheel filler spoke assembly is shown generally at 24. The prior art filler spoke assembly was attached to the lifter wheel 18 by bolts 26. The prior art filler spoke assembly 24 had to be completely installed to provide the full openings 22 required during wet ground conditions.

Figure 5:
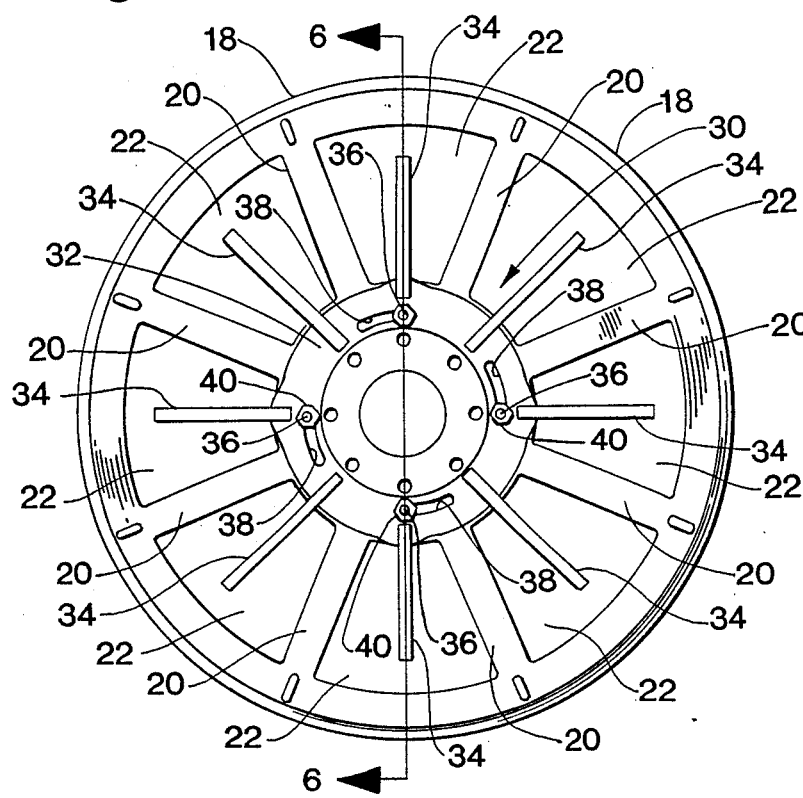
FIG. 5 is side elevational view of the inventive filler spokes in the closed position installed on a lifter wheel.
Figure 6:
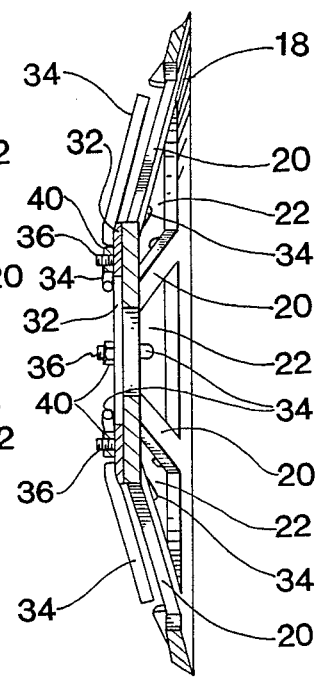
FIG. 6 is a section taken along line 6—6 of FIG. 5.

Referring now to FIGS. 5 and 6 a lifter wheel filler spoke assembly according to the present invention is shown generally at 30. In the preferred embodiment the assembly 30 consists of a center ring 32 machined out of ⅜ inch plate steel. Spokes 34 are attached to plate 32 by welding in the preferred embodiment but could be attached by many other methods. In the preferred embodiment eight spokes are provided, with the spokes 34 being equally spaced about the circumference of the ring 32. Filler spoke assembly 30 is permanently attached to the lifter wheel 18 by bolts 36 which are received by slots 38. In operation, locking nuts 40 are loosened, the filler spoke assembly 30 is rotated to the desired open or closed position, then locking nuts 40 are re-tightened. Slots 38 are sized to provide enough room to rotate spokes 34 midway between lifter wheel spokes 20. FIG. 5 shows the filler spoke assembly in the closed position used for dry ground conditions.

Figure 7:
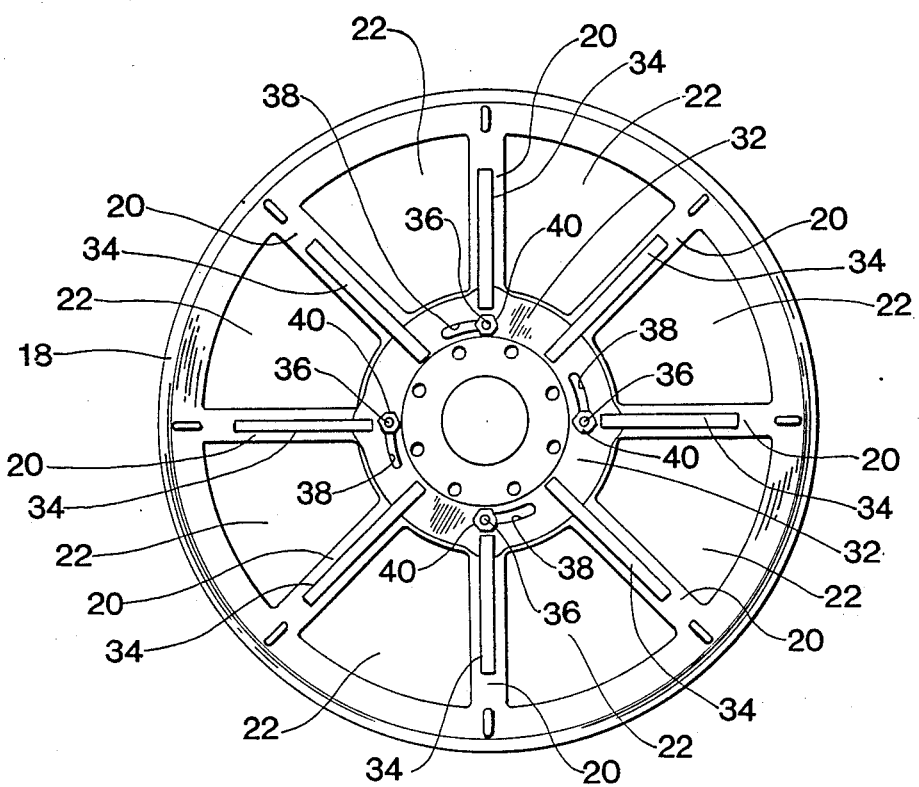
FIG. 7 is a side elevational view of the inventive filler spokes in the open position.

Referring now to FIG. 7 the filler spoke assembly 30 is shown in the open position used for wet ground conditions.

Filler spoke assembly 30 may have spokes 34 of different sizes and may also use a greater or lesser number of bolts 36 and locking nuts 40 than shown in FIGS. 5–7 to attach the assembly to the lifter wheel. This allows applicant's invention to be adapted to work with lifter wheels from Heath, Hesston, W.I.C., John Deere, Parma, Lockwood, as well as other manufacturers.

This completes the description of the preferred embodiment of the invention. Those skilled in the art may recognize other equivalents to the specific embodiment described herein which equivalents are intended to be encompassed by the claims attached hereto.

What is claimed is:

1. A lifter wheel assembly comprising:
    a lifter wheel having a plurality of lifter wheel spokes equally spaced about the lifter wheel;
    a lifter wheel filler spoke assembly constructed and arranged for permanent attachment to the lifter wheel, the lifter wheel filler spoke assembly further comprising:
    a ring plate;
    a plurality of filler spokes attached to the ring plate, the filler spokes being spaced equally about the outside perimeter of the ring plate and radiating outwardly;
    a plurality of fastener means receiving slots provided in said ring plate for permanently fastening the lifter wheel filler spoke assembly to a lifter wheel with a fastener means, the lifter wheel filler spoke assembly being fixedly fastened either in an open or closed position, the open position being defined by the filler spokes being above the lifter wheel spokes, and the closed position being defined by the filler spokes being between two lifter wheel spokes,
    whereby upon loosening the fastener means the filler spokes may be rotated from one position to another without removing the filler spoke assembly from the lifter wheel.

2. The lifter wheel filler spoke assembly of claim 1 where the fastener means comprises a bolt and a mating locking nut.

3. The lifter wheel filler spoke assembly of claim 2 where said plurality of fastener means receiving slots comprise four such slots equally spaced around the ring plate.

4. The lifter wheel filler spoke assembly of claim 2 where said plurality of fastener means receiving slots comprise three such slots equally spaced around the ring plate.

5. In a lifter wheel filler spoke assembly of the type having a ring plate with filler spokes attached thereto, the filler spokes being spaced equally about the circumference of the ring plate and radiating outwardly, the filler spoke assembly being constructed for use with a lifter wheel assembly of the type having a center hub, an outer rim and a plurality of lifter wheel spokes radiating outwardly between the hub and the outer rim, the improvement comprising:
    a plurality of fastening slot means provided in the ring plate for receiving fastener means for permanently and fixedly fastening the lifter wheel filler spoke assembly to a lifter wheel either in an open or closed position, the open position being defined by the filler spokes being above the lifter wheel spokes, and the closed position being defined by the filler spokes being between two lifter wheel spokes,
    whereby upon loosening the fastener means the filler spokes may be rotated from one position to another without removing the filler spoke assembly from the lifter wheel.

6. The lifter wheel filler spoke assembly of claim 5 where the fastener means comprises a bolt and a mating locking nut.

7. The lifter wheel filler spoke assembly of claim 6 where said plurality of slot means comprise four slots equally spaced around the ring plate.

8. The lifter wheel filler spoke assembly of claim 6 where said plurality of slot means comprise three slots equally spaced around the ring plate.

9. A lifter wheel filler spoke assembly comprising:
    a ring plate;
    a plurality of filler spokes attached to the ring plate, the filler spokes being spaced equally about the outside perimeter of the ring plate, and
    a plurality of fastening slots means provided in said ring plate for receiving fastener means for permanently fastening the lifter wheel filler spoke assembly to a lifter wheel in a fixed open or closed position.

10. The lifter wheel filler spoke assembly of claim 14 where said slot means are constructed and arranged so that the lifter wheel filler spoke assembly is in a closed position when a fastener means is fastened near one end of the slot means, and the lifter wheel filler spoke assembly is in an open position when the fastener means is fastened near the other end of the slot means.

11. The lifter wheel filler spoke assembly of claim 15 where the fastener means comprises a bolt and a mating locking nut.

12. The lifter wheel filler spoke assembly of claim 16 where said plurality of slot means comprise four slots equally spaced around the ring plate.

13. The lifter wheel filler spoke assembly of claim 16 where said plurality of slot means comprise three slots equally spaced around the ring plate.

* * * * *